(12) United States Patent
Garg et al.

(10) Patent No.: US 11,932,815 B2
(45) Date of Patent: Mar. 19, 2024

(54) CONVERSION OF SYNTHESIS GAS TO LIQUID FUELS

(71) Applicant: ExxonMobil Technology and Engineering Company, Annandale, NJ (US)

(72) Inventors: Aaron R. Garg, San Francisco, CA (US); Lei Zhang, Basking Ridge, NJ (US); Micaela Taborga Claure, Miami, FL (US); Stuart L. Soled, Pittstown, NJ (US)

(73) Assignee: EXXONMOBIL TECHNOLOGY AND ENGINEERING COMPANY, Annandale, NJ (US)

(*) Notice: Subject to any disclaimer, the term of this patent is extended or adjusted under 35 U.S.C. 154(b) by 0 days.

(21) Appl. No.: 17/843,936

(22) Filed: Jun. 17, 2022

(65) Prior Publication Data
US 2023/0019166 A1    Jan. 19, 2023

Related U.S. Application Data

(60) Provisional application No. 63/219,746, filed on Jul. 8, 2021.

(51) Int. Cl.
*C10G 2/00*      (2006.01)
*B01J 21/12*      (2006.01)
(Continued)

(52) U.S. Cl.
CPC .............. *C10G 2/334* (2013.01); *B01J 21/12* (2013.01); *B01J 23/75* (2013.01); *B01J 29/126* (2013.01);
(Continued)

(58) Field of Classification Search
CPC . B01J 21/12; B01J 23/75; B01J 19/126; B01J 29/44; B01J 29/7461; B01J 35/1057; B01J 29/7469
See application file for complete search history.

(56) References Cited

U.S. PATENT DOCUMENTS 3,354,078 A    11/1967   Miale
4,568,663 A    2/1986   Mauldin
(Continued)

FOREIGN PATENT DOCUMENTS

EP        0 266 898 B1    6/1994
WO     02/08163 A1     1/2002

OTHER PUBLICATIONS

Kibby, C., et al., "Chevron's gas conversion catalysis-hybrid catalysts for wax-freeFischer-Tropsch synthesis", Catalysis Today, vol. 215 pp. 131-141, 2013.
(Continued)

*Primary Examiner* — Jafar F Parsa
(74) *Attorney, Agent, or Firm* — Shook, Hardy & Bacon L.L.P.

(57) ABSTRACT

Catalyst systems are provided, along with corresponding methods, for single stage conversion of synthesis gas to fuel boiling range products with increased selectivity for either naphtha production ($C_5$-$C_9$) or distillate production ($C_{10}$-$C_{20}$). The increased selectivity for naphtha production or distillate production is provided in conjunction with a reduced selectivity for higher boiling range components ($C_{21+}$).

19 Claims, 2 Drawing Sheets

(51) Int. Cl.
  *B01J 23/75* (2006.01)
  *B01J 29/12* (2006.01)
  *B01J 29/44* (2006.01)
  *B01J 29/74* (2006.01)
  *B01J 35/10* (2006.01)

(52) U.S. Cl.
  CPC .......... *B01J 29/44* (2013.01); *B01J 29/7461* (2013.01); *B01J 29/7469* (2013.01); *B01J 29/7476* (2013.01); *B01J 35/1057* (2013.01); *C10G 2300/70* (2013.01)

(56) References Cited

U.S. PATENT DOCUMENTS

| | | | |
|---|---|---|---|
| 4,794,099 | A | 12/1988 | Iglesia et al. |
| 4,906,671 | A | 3/1990 | Haag et al. |
| 7,973,087 | B2 | 7/2011 | Kibby et al. |
| 2004/0092385 | A1* | 5/2004 | Timken .................. B01J 29/126 502/64 |

OTHER PUBLICATIONS

Martinez, A., et al., "A detailed study of the activity and deactivation of zeolites in hybrid Co/SiO2-zeolite Fischer-Tropsch catalysts", Journal of Catalysis, vol. 249, pp. 162-173, 2007.

Olson, D., H., et al., "Chemical and physical properties of the ZSM-5 substitutional series", Journal of Catalysis, vol. 61, Issue 2, pp. 390-396 (1980).

Miale, J., N., et al., "Catalysis by crystalline aluminosilicates: IV. Attainable catalytic cracking rate constants, and superactivity", Journal of Catalysis, vol. 6, Issue 2, pp. 278-287 (1966).

Weisz, P.B., and Miale, J.N., "Superactive crystalline aluminosilicate hydrocarbon catalysts", Journal of Catalysis, Letter to the Editors, vol. 4, Issue. 4, pp. 527-529 (1965).

Invitation to pay additional fees received for PCT Patent Application No. PCT/US2022/034106, dated Oct. 10, 2022, 11 pages.

International Search Report and Written Opinion received for PCT Patent Application No. PCT/US2022/034106, dated Dec. 1, 2022, 16 pages.

* cited by examiner

CONVERSION OF SYNTHESIS GAS TO LIQUID FUELS

CROSS-REFERENCE TO RELATED APPLICATIONS

This application is related to and claims the benefit of priority to U.S. Provisional Application No. 63/219,746 filed Jul. 08, 2021, which is herein incorporated by reference in its entirety.

FIELD

Systems and methods are provided for conversion of synthesis gas into compounds in the fuel boiling range in a single reaction stage while reducing or minimizing production of higher boiling components. BACKGROUND One pathway for converting natural gas resources to liquid fuels is to reform the natural gas to make synthesis gas, and then form liquid fuels from the synthesis gas. The Fischer-Tropsch reaction provides a known pathway for conversion of synthesis gas to hydrocarbons and hydrocarbon-like compounds.

Although the Fischer-Tropsch reaction is effective for conversion of synthesis gas to larger chain compounds, one of the difficulties with the Fischer-Tropsch reaction pathway is that the chain lengths of the compounds formed during the reaction follow the Anderson-Schulz-Flory (ASF) distribution. Based on the distribution of chain lengths, achieving a significant yield of naphtha and/or diesel boiling range compounds also results in significant yields of wax-like compounds with boiling points of 370° C. or more. Such heavier compounds could potentially be useful for forming lubricants, but adding a lubricant processing train requires substantial additional capital investment. Thus, it would be desirable to have systems and methods that can allow for formation of fuels boiling range compounds from synthesis gas while reducing or minimizing the selectivity for formation of longer chain compounds with boiling points above the fuels boiling range. This reduction in the selectivity for longer chain compounds can preferably allow for formation of still greater amounts of fuels boiling range compounds.

U.S. Pat. No. 7,973,087 describes conversion of synthesis gas to liquid fuel using a mixture of syngas conversion catalyst and dual functionality catalyst. The syngas conversion catalyst is described as including cobalt on a support containing an acidic component, and optionally further including a promoter metal. The dual functionality catalyst is described as including a hydrogenation component and an acidic component. The examples include dual functionality catalysts corresponding to Pd/ZSM-5 (MFI framework structure) and Pt/SSZ-33 (CON framework structure), which are both 3-dimensional medium pore zeotype framework structures.

U.S. Pat. No. 4,794,099 describes a catalyst for Fischer-Tropsch synthesis. The catalyst includes cobalt supported on an inorganic refractory support. The catalyst further incorporates silica.

A journal article by Kibby et al. describes hybrid conversion catalysts for conversion of synthesis gas to hydrocarbons. (Catalysis Today, Vol. 215 (2013) pp. 131-141.) The journal article describes supporting cobalt and ruthenium on ZSM-5 (MFI framework structure) and ZSM-12 (MTW framework structure). MTW is a 1-dimensional medium pore zeotype framework structure. In the results provided by the article, the yield of distillate compounds ($C_{10}$-$C_{20}$) was lower for the hybrid catalysts than for exposing the synthesis gas feed to just the corresponding FT synthesis catalyst.

A journal article by Martinez et al. describes hybrid conversion catalysts for is conversion of synthesis gas to hydrocarbons. (Journal of Catalysis, Vol. 249 (2007) pp. 162-173.) The journal article describes results from synthesis gas conversion over several types of hybrid catalyst systems having both Fischer-Tropsch synthesis activity and acidic functionality, including catalysts incorporating a USY zeolite (FAU framework structure). Based on the Bronsted acidity values reported in the journal article, it is believed that the Alpha values for all of the zeolite structures in the journal article was greater than 110.

SUMMARY

In some aspects, a catalyst system, is provided. The catalyst system includes a hydrocarbon synthesis catalyst including 5.0 wt % or more cobalt on an oxide support, relative to the weight of the oxide support. Additionally, the catalyst system includes an acid catalyst having an Alpha value of 2.0 to 100 including an amorphous oxide, a zeotype framework with a pore channel size of 6.5 Angstroms or more, or a combination thereof. The first catalyst and the second catalyst can correspond to a catalyst mixture having a weight ratio of the first catalyst to the second catalyst between 0.1 and 9.0.

In other aspects, a catalyst system is provided. The catalyst system includes a hydrocarbon synthesis catalyst including 5.0 wt % or more cobalt on an oxide support, relative to the weight of the oxide support. Additionally, the catalyst system includes an acid catalyst having an Alpha value of 80 or more including a MWW zeotype framework, a UFI zeotype framework, or a combination thereof. The first catalyst and the second catalyst can correspond to a catalyst mixture having a weight ratio of the first catalyst to the second catalyst between 0.1 and 9.0. Optionally, the acid catalyst can further include an amorphous oxide binder.

In some aspects, a method for converting a feedstock containing synthesis gas is provided. The method includes exposing a feedstock comprising synthesis gas to a catalyst system as described herein under conversion conditions comprising a temperature of 190° C. to 280° C. for conversion of 30 vol % or more of the CO in the feedstock to form hydrocarbons.

DETAILED DESCRIPTION

Figure 1:
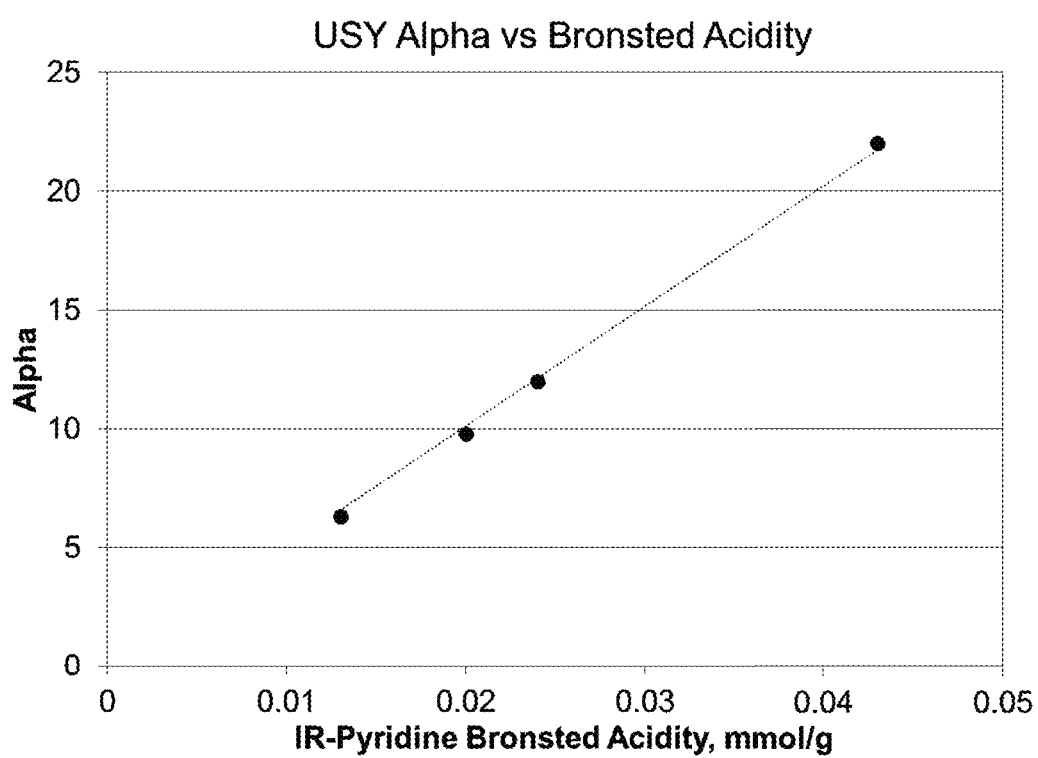
FIG. 1 shows a correlation between Alpha value and Bronsted acidity for USY.

All numerical values within the detailed description and the claims herein are modified by "about" or "approximately" the indicated value, and take into account experimental error and variations that would be expected by a person having ordinary skill in is the art.

Overview

In various aspects, catalyst systems are provided, along with corresponding methods, for single stage conversion of synthesis gas to fuel boiling range products with increased selectivity for either naphtha production ($C_5$-$C_9$) or distillate production ($C_{10}$-$C_{20}$). The increased selectivity for naphtha production or distillate production is provided in conjunction with a reduced selectivity for higher boiling range components ($C_{21+}$).

One of the characteristics of using Fischer-Tropsch synthesis to convert synthesis gas into hydrocarbons is that the selectivity to products of different carbon chain lengths follows an ASF distribution. The peak in the distribution can be shifted by selecting different reaction conditions, but the general shape is maintained across a variety of conditions.

Conventionally, one of the difficulties with using Fischer-Tropsch synthesis to form fuels is identifying conditions that provide a desirable fuels product. One option is to select conditions that result in minimizing selectivity for methane and light gas. This results in increased production of naphtha and distillate boiling range compounds. However, because a conventional Fischer-Tropsch process generates products that follow an ASF distribution, minimizing the selectivity for methane and light gas also results in substantial production of $C_{21+}$ compounds. These waxy $C_{21+}$ compounds cannot be readily incorporated into fuels, and typically require further processing to convert the waxy compounds into lower boiling range components.

Some conventional synthesis methods have attempted to overcome the production of waxy compounds by using a catalyst system that also includes a hydrogenation catalyst and/or cracking catalyst. Addition of other types of catalyst to a catalyst system for conversion of synthesis gas can reduce formation of $C_{21+}$ compounds and/or crack $C_{21+}$ compounds after formation to make lower boiling components. While this strategy can generally be effective, further improvements can be made. For example, when distillate (e.g., diesel) fuel is the desired product, the addition of additional catalysts to the catalyst system has conventionally resulted in a decrease in diesel selectivity relative to just using Fischer-Tropsch synthesis catalyst. Alternatively, when naphtha fuel is the desired product, the addition of additional catalysts to the syngas conversion catalyst system can increase the amount of naphtha, but still higher selectivity for naphtha production would be desirable.

In some aspects, catalyst systems with increased diesel selectivity are provided. In such aspects, the catalyst system can include a Co-containing synthesis catalyst and an open framework cracking catalyst with low to moderate acidity. The open framework cracking is catalyst can correspond to an amorphous catalyst or a zeotype catalyst with sufficiently large pore size, such as a USY catalyst. The open framework cracking catalyst can have an acidity corresponding to an Alpha value of 100 or less, or 80 or less. This is unexpected, as conventionally it would be expected that having a higher acidity for the cracking catalyst would provide improved results, due in part to the lower reaction temperatures that the synthesis process is performed at. However, it has been discovered that using an acidic catalyst with only moderate acidity or lower can provide improved diesel yields. Without being bound by any particular theory, it is believed that the combination of having a relatively open framework with a low to moderate acidity can allow larger waxy molecules to access active sites within the framework to facilitate conversion to distillate boiling range compounds, while reducing or minimizing overcracking of molecules to naphtha boiling range compounds, which may occur with high acidity catalysts. Optionally, a hydrogenation metal can be included as part of the open framework cracking catalyst.

In other aspects, catalyst systems with increased naphtha selectivity are provided. In such aspects the catalyst system can correspond to a Co-containing synthesis catalyst and a cracking catalyst which provides surface pockets for reaction with waxy molecules while having a pore structure that is relatively inaccessible for waxy compounds due to diffusional limitation. MWW framework catalysts are an example of this type of structure. MWW framework catalysts are medium pore catalysts. Without being bound by any particular theory, it is believed that the MWW framework structure provides only limited opportunities for waxy molecules to enter the pores of the structure for reaction. However, MWW framework catalysts also include surface pockets that can serve as active sites for larger molecules. It is believed that these surface sites can allow for increased conversion of waxy compounds and distillate compounds while reducing or minimizing overcracking of naphtha to light gases ($C_{4-}$). It is believed that UFI framework catalysts provide another example of this type of structure.

Definitions

In this discussion, acidity is defined based on the Alpha value for a catalyst. Alpha value is a measure of the acid activity of a zeolite catalyst (or more generally a zeotype catalyst) as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. Higher Alpha values correspond with a more active cracking catalyst.

In this discussion, naphtha selectivity is defined based on production of compounds containing between 5 and 9 carbon atoms ($C_5$-$C_9$). In this discussion, diesel selectivity is defined based on production of compounds containing between 10 and 20 carbon atoms ($C_{10}$-$C_{20}$).

In this discussion, the space velocity of synthesis gas is described relative to the weight of synthesis catalyst (Fischer-Tropsch catalyst) in a catalyst system. An example of the units for describing the space velocity is liters of synthesis gas per gram of synthesis (Fischer-Tropsch) catalyst per hour. Such units can be abbreviated as $L/g_{FT}/hr$.

Diesel Selective Catalyst System

In some aspects, a diesel selective catalyst system can be used for conversion of synthesis gas into fuels boiling range products. The diesel selective catalyst system can include two types of catalyst particles. One type of catalyst particle can correspond to a Co-containing catalyst having Fischer-Tropsch reaction activity, with the Co supported on an oxide support. The second type of catalyst particle can correspond to an open framework catalyst that has low to moderate acidity. It has been discovered that such a catalyst system can unexpectedly provide diesel selectivity greater than the diesel selectivity of a Fischer-Tropsch catalyst alone while also reducing or minimizing the selectivity for $C_{21+}$ compounds.

The catalyst having Fischer-Tropsch conversion activity can correspond to a Co-based catalyst. For example, the catalyst can correspond to Co nanoparticles supported on a low acidity oxide support, such as a silica, titania, alumina, or a combination thereof. The catalyst can include 5.0 wt % to 25 wt % of Co relative to the total weight of the catalyst, or 5.0 wt % to 20 wt %, or 5.0 wt % to 15 wt %, or 5.0 wt % to 10 wt %. The Alpha value of the support (prior to Co deposition) can be 20 or less, or 10 or less, or 5.0 or less, such as down to 0.6 or possibly still lower. Additionally or alternately, in some aspects, a commercially available Co-based Fischer-Tropsch catalyst can be used. Co-based synthesis catalysts are preferred based on the ability of Co to provide Fischer-Tropsch conversion activity at relatively low temperatures to mitigate common deactivation issues. An example of a Co-based Fischer-Tropsch catalyst is described in U.S. Pat. No. 4,794,099.

In some aspects, the Co-based catalyst can further include a promoter metal. In such aspects, the activity of the catalyst can be enhanced by the addition, optionally as part of a catalyst support, of a variety of metals, including sodium, potassium, copper, cerium, rhenium, manganese, platinum, palladium, iridium, rhodium, molybdenum, tungsten, ruthenium or zirconium. Such catalysts are well known, and an example of such a catalyst is described in U.S. Pat. No. 4,568,663 as well as European Patent No. 0 266 898. In some aspects, the promoter metal can be ruthenium, rhenium, zirconium, or a combination thereof.

In other aspects, the promoter metal can be Ru, Re, Mn, Zr, Ir, Au, Ag, Ce, Ba, or a combination thereof. In various aspects, the catalyst can include 0.05 wt % to 2.0 wt % of the promoter metal, or 0.05 wt % to 1.5 wt %, or 0.2 wt % to 1.5 wt %.

The catalyst system can also include a catalyst with cracking activity. To provide diesel selectivity, the cracking catalyst can have low to moderate acidity while providing a relatively open framework. In various aspects, the cracking catalyst can have an Alpha value (prior to metal addition) of 100 or less, or 80 or less, or 50 or less, or 25 or less, such as down to 1.0 or possibly still lower.

In addition to having low to moderate acidity, the cracking catalyst can have a relatively open framework. This can be achieved, for example, by using an amorphous cracking catalyst, or by using a cracking catalyst of a zeotype with a sufficiently large pore structure. In aspects where the cracking catalyst has a zeotype framework, the cracking catalyst can include pore channels with a diameter of roughly 6.5 Angstroms or more, 7.0 Angstroms or more, or 7.5 Angstroms or more, or 8.0 Angstroms or more, such as up to 20 Angstroms or possibly still higher. In this discussion, the pore channel diameter is defined as the diameter of the largest sphere that can diffuse along the pore channel. Examples of framework types having a pore channel with a diameter of 6.5 Angstroms or more include, but are not limited to, FAU (Zeolite Y, USY), DFO (DAF-1), EMT (EMC-2), ETR (ECR-34), GME (Gmetlinite), IFT (ITQ-53) IFU (ITQ-54), MEI (ZSM-18), MOZ (ZSM-10), MSE (MCM-68), OFF (Offretite), and IWV (ITQ-27).

For cracking catalysts with amorphous supports, in some aspects the amorphous support can have a pore volume of 0.77 $cm^3/g$ or more (as measured by Hg porosiemtry) of pores with a diameter of 7.0 Angstroms or more and a surface area>320 $m^2/g$, which provides a relatively open framework.

Optionally, the cracking catalyst can also include a hydrogenation metal. Examples of hydrogenation metals include, but are not limited to, metals from Group 8-10 of the IUPAC periodic table. In some aspects, the hydrogenation metal can be Pt, Pd, Rh, Ir, Co, Ni, Ru, or combinations thereof. For example, the hydrogenation metal can be Pt, Pd, or a combination thereof. The amount of hydrogenation metal can be 0.05 wt % to 5.0 wt % relative to the weight of the cracking catalyst, or 0.05 wt % to 2.0 wt %.

Optionally, a cracking catalyst including a zeotype framework structure can further include an amorphous oxide binder. In such optional aspects, the cracking catalyst can is include 0.1 wt % to 50 wt % of amorphous oxide binder, or 0.1 wt % to 10 wt %, or 0.1 wt % to 5.0 wt %.

A catalyst system with improved distillate selectivity can be formed by mixing a Co-containing synthesis catalyst with the distillate selective cracking catalyst in a suitable ratio. In various aspects, the weight ratio of the Co-containing synthesis catalyst to the distillate selective catalyst can range from 0.1 to 9.0 (i.e., from 1:9 to 9:1). Any convenient type of catalyst mixture can be used. In some aspects, the various types of catalyst particles can be mixed together to form a mixture of separate particles. In some aspects, the various types of catalyst particles can be ground into powders, mixed together, and then pressed to form particles containing a mixture of the various types of catalysts. In still other aspects, any convenient method for forming a physical mixture of the two (or more) types of catalyst particles can be used. ps Naphtha Selective Catalyst System In some aspects, a naphtha selective catalyst system can be used for conversion of synthesis gas into fuels boiling range products. The naphtha selective catalyst system can include two types of catalyst particles. One type of catalyst particle can correspond to a Co-containing catalyst having Fischer-Tropsch conversion activity, with the Co supported on an oxide support. The second type of catalyst particle can correspond to catalyst comprising an MWW zeotype framework. It has been discovered that such a catalyst system can provide unexpectedly high naphtha selectivity.

The catalyst having Fischer-Tropsch activity can correspond to a Co-based catalyst. For example, the catalyst can correspond to Co nanoparticles supported on a low acidity oxide support, such as a silica, titania, alumina, or a combination thereof. The catalyst can include 5.0 wt % to 25 wt % of Co relative to the total weight of the catalyst, or 5.0 wt % to 20 wt %, or 5.0 wt % to 15 wt %, or 5.0 wt % to 10 wt %. The Alpha value of the support (prior to Co deposition) can be 20 or less, or 10 or less, or 5.0 or less, such as down to 0.1 or possibly still lower. Additionally or alternately, in some aspects, a commercially available Co-based Fischer-Tropsch catalyst can be used. Co-based synthesis catalysts are preferred based on the ability of Co to provide Fischer-Tropsch conversion activity at relatively low temperatures to mitigate common deactivation issues.

In some aspects, the Co-based catalyst can further include a promoter metal. In such aspects, the activity of the catalyst can be enhanced by the addition, optionally as part of a catalyst support, of a variety of metals, including sodium, potassium, copper, cerium, rhenium, manganese, platinum, palladium, iridium, rhodium, molybdenum, tungsten, is ruthenium or zirconium. Such catalysts are well known, and an example of such a catalyst is described in U.S. Pat. No. 4,568,663 as well as European Patent No. 0 266 898. In some aspects, the promoter metal can be ruthenium, rhenium, zirconium, or a combination thereof. In other aspects, the promoter metal can be Ru, Re, Mn, Zr, Ir, Au, Ag, Ce, Ba, or a combination thereof. In various aspects, the catalyst can include 0.05 wt % to 2.0 wt % of the promoter metal, or 0.05 wt % to 1.5 wt %, or 0.2 wt % to 1.5 wt %.

The catalyst system can also include a catalyst with cracking activity. To provide enhanced naphtha selectivity, the cracking catalyst can have surface pockets that allow larger compounds to have access to active sites in the catalyst without requiring the larger compounds to enter the interior of the pore structure of the catalyst. Without being bound by any particular theory, it is believed that using a cracking catalyst with surface pockets can allow larger compounds to crack without the cracking products becoming trapped in the pore and "overcracking" to form light gases. The MWW framework structure is an example of a zeotype that provides surface pockets for increasing naphtha selectivity during conversion of synthesis gas. Examples of structures having the MWW framework structure include EMM-10, MCM-22, MCM-49, and MCM-56. The UFI framework structure is another example of a zeotype that provides suitable surface pockets for increasing naphtha selectivity. Additionally, in various aspects, a cracking catalyst for naphtha selectivity can have an Alpha value of 85 or more, or 105 or more, or 125 or more, such as up to 400 or possibly still higher.

Optionally, the cracking catalyst can also include a hydrogenation metal. Examples of hydrogenation metals include, but are not limited to, metals from Group 8-10 of the IUPAC periodic table. In some aspects, the hydrogenation metal can be Pt, Pd, Rh, Ir, Co, Ni, Ru or combinations thereof. For example, the hydrogenation metal can be Pt, Pd, or a combination thereof. The amount of hydrogenation metal can be 0.05 wt % to 5.0 wt % relative to the weight of the cracking catalyst, or 0.05 wt % to 2.0 wt %.

Optionally, the cracking catalyst can include an amorphous oxide binder. In such optional aspects, the cracking catalyst can include 0.1 wt % to 50 wt % of amorphous oxide binder, or 0.1 wt % to 10 wt %, or 0.1 wt % to 5.0 wt %. $SiO_2$ is an example of a suitable binder.

A catalyst system with improved naphtha selectivity can be formed by mixing a Co-containing synthesis catalyst with the naphtha selective cracking catalyst in a suitable ratio. In various aspects, the weight ratio of the Co-containing synthesis catalyst to the naphtha selective catalyst can range from 0.1 to 9.0 (i.e., from 1:9 to 9:1). Any convenient type of catalyst mixture can be used. In some aspects, the various types of catalyst particles can be is mixed together to form a mixture of separate particles. In some aspects, the various types of catalyst particles can be ground into powders, mixed together, and then pressed to form particles containing a mixture of the various types of catalysts. In still other aspects, any convenient method for forming a physical mixture of the two (or more) types of catalyst particles can be used.

Synthesis of Hydrocarbonaceous Compounds—Catalytic Conversion of Synthesis Gas

One process for converting synthesis gas (sometimes referred to as syngas) to fuel boiling range products is the Fischer-Tropsch process, in which syngas can be reacted over a catalyst at elevated temperature and pressure to produce primarily long-chain hydrocarbons (or hydrocarbonaceous compounds) and potentially small amounts of oxygenates. The most common catalysts utilized can typically include iron-based catalysts (for so-called high-temperature-Fischer-Tropsch synthesis) and cobalt-based catalysts (for so-called low temperature-Fischer-Tropsch synthesis). Iron-based catalysts, along with other related catalysts, can also be referred to as shifting catalysts, as the water-gas shift reaction can tend to be readily equilibrated on these catalysts. Co-containing catalysts and other related catalysts can be referred to as non-shifting, as they do not appear to substantially perform and/or catalyze the water-gas shift equilibration reaction at standard operating conditions below approximately 250° C. While other catalyst systems and process conditions may be employed, typical commercial operations can utilize a catalyst based on either cobalt or iron. In various aspects, Co-containing catalysts can be preferred in the catalyst systems described herein.

The synthesis gas feed used in typical Fischer-Tropsch processes can comprise a mixture of $H_2$ and CO wherein $H_2$:CO are present in a molar ratio of 1.7 or more, or 2.1 or more, such as 1.7 to 2.5, or 2.1 to 2.5, or 1.7 to 2.1. Fischer-Tropsch processes can be implemented in a variety of systems such as fixed bed, slurry bed, and multiple channel designs. In various aspects, Fischer-Tropsch processes can be employed in a wide variety of reactors, such as small reactors (e.g. 1+ barrel/day) or in very large reactors (e.g. 10,000-50,000 barrels/day or more). The product, typically a hydrocarbon wax, can be used as is and/or can be converted to other (e.g. liquid) components by a variety of well-known chemical conversion processes.

Generally, the Fischer-Tropsch process can be operated in the temperature range of 150° C. to 350° C. (302° F. — 662° F.) and at pressures ranging from 100 kPaa to 10 MPaa. In various aspects where a Fischer-Tropsch process is performed using a catalyst system that includes a synthesis catalyst and a cracking catalyst, the temperature range can be 190° C. to 280° C., or 190° C. to 260° C., or 210° C. to 260° C. In some aspects where an amorphous catalyst is used as the cracking catalyst to for a distillate selective catalyst system, the temperature range can be 210° C. to 280° C., or 210° C. to 260° C. The space velocity of the synthesis gas relative to the weight of the synthesis catalyst (i.e., the Co-containing Fischer-Tropsch catalyst) in the catalyst system can be 0.25 — 10.0 liters of synthesis gas per gram of catalyst per hour, or 0.25-10.0 $L/g_{FT}/hr$. One method for selecting the reaction conditions can be to select conditions that are effective for conversion of 30 vol % or more of the synthesis gas in the feed to the conversion process (on a per pass basis, relative to the volume of the synthesis gas in the feed to the conversion process), or 50 vol % or more, or 60 vol % or more, such as up to substantially complete conversion of the synthesis gas (i.e., up to 100 vol %). The volume of synthesis gas corresponds to the combined volume of Hz and CO in the feed to the conversion process. In some aspects, a fraction including unconverted synthesis gas can be separated from the conversion products and recycled back to the conversion process.

Modifying the reaction conditions within the Fischer-Tropsch process can provide control over the yield and/or composition of the reaction products, including at least some control of the chain length of the reaction products. Typical reaction products can include alkanes and olefins (primary reaction products), as well as one or more of oxygenates, other hydrocarbonaceous compounds similar to hydrocarbons but which may contain one or more heteroatoms different from carbon and hydrogen, and various additional reaction by-products and/or unreacted feed components. The primary products from Fischer-Tropsch synthesis can be used directly, and/or can undergo further processing, as desired. For example, a Fischer-Tropsch synthesis process for forming distillate boiling range molecules can generate one or more product streams that can subsequently be dewaxed and/or hydrocracked in order to generate final products, e.g. with desired chain lengths, viscosities, and cold flow properties.

In aspects where a distillate selective catalyst system is used, the selectivity for forming distillate compounds ($C_{10}$-$C_{20}$) for the catalyst system can be greater than the selectivity for distillate compounds for the synthesis catalyst alone under similar conditions. This is unexpected, as conventionally it would be expected that the addition of cracking compounds would suppress the selectivity for both distillate ($C_{10}$-$C_{20}$) and waxy ($C_{21+}$) compounds. This increased selectivity for formation of distillate compounds can be achieved under conversion conditions that result in 30 vol % or more conversion of the synthesis gas (on a per pass basis, relative to the volume of synthesis gas in the feed to the conversion process), or 40 vol % or more, or 50 vol % conversion or more, or 60 vol % or more, such as up to substantially complete conversion.

In aspects where a naphtha selective catalyst system is used, the selectivity for forming naphtha compounds ($C_5$-$C_9$) for the catalyst system can be unexpectedly high relative to other types of catalyst systems including a cracking catalyst. This increased selectivity for formation of naphtha compounds can be achieved under conversion conditions that result in 30 vol % or more conversion of the synthesis gas (on a per pass basis, relative to the volume of synthesis gas in the feed to the conversion process), or 40 vol % or more, or 50 vol % conversion or more, or 60 vol % or more, such as up to substantially complete conversion.

EXAMPLE 1

Comparison of Alpha value with Bronsted Acidity

In this discussion, the acidity of various catalysts is described using the Alpha value test. Other types of acidity characterizations are also available. For example, another method for characterizing acidity is based on the Bronsted acidity of a catalyst. This can be determined, for example, by determining the amount of Bronsted acid sites based on adsorption of pyridine at a specified temperature, e.g. 150° C. The adsorption of the pyridine to the acid sites can be determined using infrared (IR) spectroscopy.

It is noted that the number of Bronsted acid sites that will show pyridine adsorption is dependent on the temperature. As the temperature is increased, pyridine will increasingly desorb from weakly acidic sites so that the total amount of adsorption is reduced.

Thus, a measurement of Bronsted acidity at a lower temperature can be used as a lower bound for what the measurement of Bronsted acidity would be at a higher temperature, since increasing the temperature will reduce the amount of adsorbed pyridine.

Figure 2:
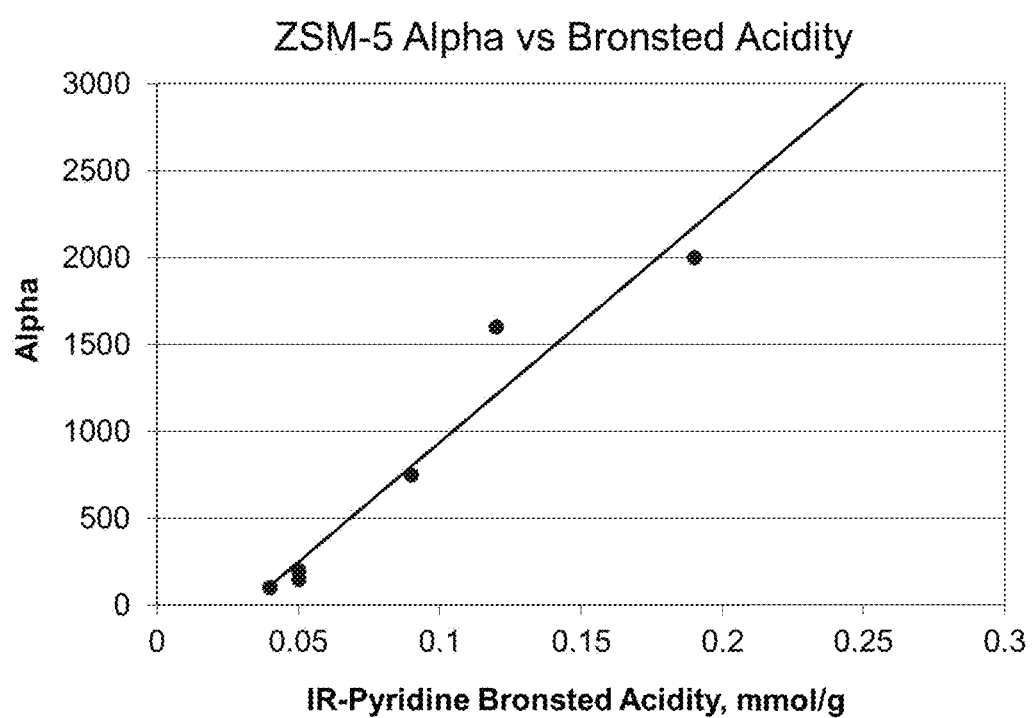
FIG. 2 shows a correlation between Alpha value and Bronsted acidity for ZSM-5.

For a given type of acidic catalyst, the Alpha value for the catalyst can be correlated with the Bronsted acidity. This correlation is generally a linear correlation. The slope of the linear correlation can vary depending on the nature of the catalyst. FIG. 1 and FIG. 2 provide representative Alpha value to Bronsted acidity correlations for two different types of acidic catalysts. FIG. 1 shows the correlation between Alpha value and Bronsted acidity for ultrastable Y zeolite (USY). FIG. 2 shows the correlation between Alpha value and Bronsted acidity for ZSM-5. The correlations in FIG. 1 and FIG. 2 are for Bronsted acidity as measured at a pyridine adsorption temperature of 150° C.

In FIG. 1, the correlation is shown for Alpha value with Bronsted acidity in mmol/g (as determined by IR spectroscopy) for USY. As shown in FIG. 1, for each increase in Alpha value of 10 units, the corresponding Bronsted acidity increases by roughly 0.02 mmol/g, or roughly 20 μmol/g. Thus, an Alpha value of 100 for a USY catalyst corresponds to a Bronsted acidity measured at 150° C. of roughly 0.2 mmol/g or 200 μmol/g. As noted above, because pyridine desorption increases with increasing temperature, a Bronsted acidity of 0.2 is mmol/g at 250° C. would correspond to a still higher Alpha value.

FIG. 2 shows a similar type of correlation diagram for ZSM-5. As shown in FIG. 2, the Alpha value for ZSM-5 increases much more rapidly for ZSM-5, as compared with the USY shown in FIG. 1. For example, as shown in FIG. 2, a Bronsted acidity measured at 150° C. of roughly 0.2 mmol/g for ZSM-5 corresponds to an Alpha value of over 2000.

Similar types of correlation diagrams can also be prepared for any convenient type of zeotype framework. It is noted that for mordenite (MOR), a Bronsted acidity at 150° C. of 0.4 mmol/g would correspond to an Alpha value of more than 1000. For zeolite Beta, a Bronsted acidity at 150° C. of 0.18 mmol/g would correspond to an Alpha value of roughly 700.

EXAMPLE 2

Naphtha Selectivity

To investigate naphtha selectivity, a series of catalyst systems was formed and placed in a laboratory scale reactor. One part of the system was a Co-containing catalyst with Fischer-Tropsch conversion activity. The Co-containing catalyst included 11 wt % Co relative to the weight of the Co-containing catalyst, on a titania support. Another part of the catalyst system was a cracking catalyst. The weight of Co-containing catalyst was roughly equal to the weight of the cracking catalyst. The catalysts were ground to powders, mixed together, pressed, and sized to 50-60 mesh (250-300 pin) before being loaded into the reactor. Silicon carbide was also added as an inert diluent to maintain isothermal conditions inside the reactor. The catalyst systems were activated in hydrogen at 375° C. or 400° C. for at least 3 hours prior to use for conversion of synthesis gas.

The cracking catalysts used in the catalyst systems included the following: ZSM-5 (MFI framework); EMM-10 (MWW framework); zeolite Beta (BEA framework); ZSM-48 (MRE framework); and ZSM-12 (MTW framework). All of these cracking catalysts have a largest pore channel size of less than 7.0 Angstroms. Additionally, 0.6 wt % of Pt was supported on each of these cracking catalysts.

The catalyst systems were used for conversion of synthesis gas at a pressure of 20 bar-a (~2.0 MPa-a) and temperatures between 200° C. and 250° C. For the naphtha selectivity investigation, all of the runs were performed at a space velocity of synthesis gas of roughly 2.0 L/$g_{FT}$/hr. The synthesis gas had a molar ratio of H2 to CO of 2.0. Product compositions exiting the reactor were characterized using gas chromatography.

Table 1 shows results from the naphtha selectivity investigation. In Table 1, the type of catalyst system is shown along with the temperature of the synthesis gas. For comparison, runs using only the Co-containing Fischer-Tropsch catalyst are also shown.

TABLE 1

| | | | | | Naphtha Selectivity | | | |
|---|---|---|---|---|---|---|---|---|
| Catalyst | Alpha | Temp. (° C.) | CO conv. (%) | $C_1$ sel. (%) | $C_2$-$C_4$ sel. (%) | $C_5$-$C_9$ sel. (%) | $C_{10}$-$C_{20}$ sel. (%) | $C_{21+}$ Wax sel. (%) |
| FT | 0.6 | 200 | 54 | 5 | 7 | 14 | 16 | 58 |
| FT | 0.6 | 220 | 90 | 5 | 5 | 13 | 15 | 60 |
| FT | 0.6 | 230 | 94 | 6 | 6 | 16 | 20 | 52 |

TABLE 1-continued

Naphtha Selectivity

| Catalyst | Alpha | Temp. (° C.) | CO conv. (%) | $C_1$ sel. (%) | $C_2$-$C_4$ sel. (%) | $C_5$-$C_9$ sel. (%) | $C_{10}$-$C_{20}$ sel. (%) | $C_{21+}$ Wax sel. (%) |
|---|---|---|---|---|---|---|---|---|
| FT + Pt/ZSM-5 | 300 | 230 | 51 | 15 | 13 | 34 | 14 | 24 |
| FT + Pt/ZSM-5 | 300 | 250 | 85 | 19 | 14 | 35 | 13 | 19 |
| FT + Pt/EMM-10 | 140 | 230 | 42 | 15 | 17 | 42 | 11 | 15 |
| FT + Pt/EMM-10 | 140 | 240 | 59 | 17 | 17 | 42 | 11 | 13 |
| FT + Pt/EMM-10 | 140 | 250 | 73 | 21 | 17 | 38 | 11 | 13 |
| FT + Pt/Beta | 100 | 240 | 44 | 22 | 22 | 30 | 13 | 13 |
| FT + Pt/Beta | 100 | 250 | 60 | 23 | 22 | 32 | 12 | 11 |
| FT + Pt/ZSM-48 | 80 | 220 | 45 | 13 | 14 | 20 | 14 | 39 |
| FT + Pt/ZSM-48 | 80 | 230 | 74 | 12 | 12 | 23 | 18 | 35 |
| FT + Pt/ZSM-48 | 80 | 250 | 96 | 17 | 16 | 29 | 19 | 19 |
| FT + Pt/ZSM-12 | 60 | 220 | 46 | 13 | 12 | 22 | 13 | 40 |
| FT + Pt/ZSM-12 | 60 | 230 | 72 | 13 | 12 | 25 | 15 | 36 |
| FT + Pt/ZSM-12 | 60 | 250 | 95 | 16 | 16 | 34 | 13 | 21 |

As shown in Table 1, the catalyst systems including EMM-10 as the cracking catalyst showed unexpectedly higher naphtha selectivity than any of the other catalyst systems, while also providing substantially low wax selectivity relative to the various catalyst systems. This unexpected benefit in naphtha selectivity was provided at CO conversion levels of 42 vol %, 59 vol %, and 73 vol %. This demonstrates that EMM-10 provided this unexpected naphtha selectivity at any commercially desirable level of CO (or synthesis gas) conversion. It is noted that the Alpha value of 140 for the EMM-10 catalyst was substantially lower than the Alpha value of the ZSM-5 catalyst, but the catalyst system including EMM-10 provided substantially higher naphtha selectivity. As a result, it is believed that the improved naphtha selectivity of the EMM-10 is due to the framework structure of the catalyst, which includes 12-member ring pockets on the external surface (7.0×9.1Å) that are not present in the other cracking catalysts shown in Table 1.

EXAMPLE 3

Diesel Selectivity

It is noted that in Table 1, the highest distillate selectivity ($C_{10}$-$C_{20}$) that was is observed was 20 wt %, which was achieved in one of the comparative runs that used Co-containing Fischer-Tropsch synthesis catalyst without an accompanying cracking catalyst. It is believed that the lower distillate selectivity for the catalyst systems shown in Table 1 is due to a combination of having higher acidity (i.e., high Alpha values) with smaller pore channels. This belief is in part based on the discovery that using a cracking catalyst with a medium to low acidity plus a relatively open framework resulting in catalyst systems that could provide higher distillate selectivity that using a synthesis catalyst alone.

Table 2 shows results from additional catalyst system investigations. The results in Table 2 were generated in a similar manner to the results shown in Table 1. One exception to this is for the final catalyst system shown in Table 2. For the catalyst system that included USY without a supported hydrogenation metal, a space velocity of synthesis gas of roughly 3.0 L/$g_{FT}$/hr was used, rather than the value of 2.0 L/$g_{FT}$/hr that was used for the other runs. For ease of comparison, the runs from Table 1 including only the synthesis (Fischer-Tropsch) catalyst are also included in Table 2.

TABLE 2

Distillate Selectivity

| Catalyst | Alpha | Temp. (° C.) | CO conv. (%) | $C_1$ sel. (%) | $C_2$-$C_4$ sel. (%) | $C_5$-$C_9$ sel. (%) | $C_{10}$-$C_{20}$ sel. (%) | $C_{21+}$ Wax sel. (%) |
|---|---|---|---|---|---|---|---|---|
| FT | 0.6 | 200 | 54 | 5 | 7 | 14 | 16 | 58 |
| FT | 0.6 | 220 | 90 | 5 | 5 | 13 | 15 | 60 |
| FT | 0.6 | 230 | 94 | 6 | 6 | 16 | 20 | 52 |
| FT + Pt/USY | 10 | 220 | 63 | 10 | 8 | 18 | 21 | 43 |
| FT + Pt/USY | 10 | 230 | 90 | 9 | 8 | 20 | 23 | 40 |

TABLE 2-continued

| | | | | Distillate Selectivity | | | | |
|---|---|---|---|---|---|---|---|---|
| Catalyst | Alpha | Temp. (° C.) | CO conv. (%) | $C_1$ sel. (%) | $C_2$-$C_4$ sel. (%) | $C_5$-$C_9$ sel. (%) | $C_{10}$-$C_{20}$ sel. (%) | $C_{21}$+ Wax sel. (%) |
| FT + Pd/SiO$_2$—Al$_2$O$_3$ | 6 | 230 | 45 | 15 | 14 | 23 | 21 | 27 |
| FT + Pd/SiO$_2$—Al$_2$O$_3$ | 6 | 240 | 67 | 16 | 14 | 25 | 23 | 22 |
| FT + USY | 70 | 220 | 64 | 9 | 7 | 14 | 29 | 41 |

Three types of catalyst systems were used to generate the results in Table 2. The first catalyst system included a USY catalyst (including a pore channel with greater than 7.0 Angstrom size) that also included 0.6 wt % of Pt as a hydrogenation metal. A second catalyst system included a higher acidity USY catalyst that did not have a supported hydrogenation metal. A third catalyst system included an amorphous silica-alumina catalyst, with 0.5 wt % Pd as a supported hydrogenation metal.

As shown in Table 2, the catalyst systems including USY or an amorphous cracking catalyst all provided an unexpectedly higher distillate selectivity than using a synthesis catalyst alone. Thus, the open framework, lower acidity catalysts used in the catalyst systems shown in Table 2 allowed for a reduction in wax selectivity while also allowing for an increase in distillate selectivity. It is noted that the highest distillate selectivity was provided by the catalyst system including the USY catalyst without a supported hydrogenation metal. However, the amorphous catalysts provided a greater reduction in wax selectivity as compared is with the USY catalysts.

Additional Embodiments

Embodiment 1. A catalyst system, comprising: a hydrocarbon synthesis catalyst comprising 5.0 wt % or more cobalt on an oxide support, relative to the weight of the oxide support; and an acid catalyst having an Alpha value of 2.0 to 100 comprising an amorphous oxide, a zeotype framework with a pore channel size of 6.5 Angstroms or more, or a combination thereof, the first catalyst and the second catalyst comprising a catalyst mixture having a weight ratio of the first catalyst to the second catalyst between 0.1 and 9.0.

Embodiment 2. The catalyst system of Embodiment 1, wherein the acid catalyst comprises an Alpha value of 2.0 to 80.

Embodiment 3. The catalyst system of any of the above embodiments, wherein the acid catalyst comprises an FAU zeotype framework, or wherein the amorphous oxide comprises silica and alumina.

Embodiment 4. A catalyst system, comprising: a synthesis catalyst comprising 5.0 wt % or more cobalt on an oxide support, relative to the weight of the oxide support; and an acid catalyst having an Alpha value of 80 or more comprising a MWW zeotype framework, a UFI zeotype framework, or a combination thereof, the first catalyst and the second catalyst comprising a catalyst mixture having a weight ratio of the first catalyst to the second catalyst between 0.1 and 9.0.

Embodiment 5. The catalyst system of Embodiment 4, wherein the acid catalyst comprises an Alpha value of 100 or more, or wherein the acid catalyst further comprises an amorphous oxide binder, or wherein the acid catalyst comprises EMM-10, or a combination thereof.

Embodiment 6. The catalyst system of any of the above embodiments, wherein the acid catalyst does not include a supported hydrogenation metal.

Embodiment 7. The catalyst system of any of the above embodiments, wherein the acid catalyst further comprises 0.1 wt % to 5.0 wt % of a hydrogenation metal supported on the acid catalyst, relative to the weight of the acid catalyst; or wherein the hydrocarbon synthesis catalyst further comprises 0.05 wt % to 2.0 wt % of a promoter metal relative to a is weight of the hydrocarbon synthesis catalyst; or a combination thereof.

Embodiment 8. The catalyst system of Embodiment 7, i) wherein the hydrogenation metal comprises Pt, Pd, or a combination thereof, ii) wherein the promoter metal comprises Ru, Re, Mn, Zr, Ir, Au, Ag, Ce, Ba or a combination thereof; or iii) a combination of i) and ii).

Embodiment 9. The catalyst system of any of the above embodiments, wherein the catalyst mixture comprises catalyst particles comprising a mixture of the hydrocarbon synthesis catalyst and the acid catalyst.

Embodiment 10. The catalyst system of any of the above embodiments, wherein the oxide support of the synthesis catalyst comprises an Alpha value of less than 2.0.

Embodiment 11. A method for converting a feedstock containing synthesis gas, comprising: exposing a feedstock comprising synthesis gas to a catalyst system under conversion conditions comprising a temperature of 190° C. to 280° C. for conversion of 30 vol % or more of the CO in the feedstock to form hydrocarbons, the catalyst system comprising a catalyst system according to any of Embodiments 1-10.

Embodiment 12. The method of Embodiment 11, wherein the conversion conditions comprise a temperature of 210° C. to 260° C.

Embodiment 13. The method of Embodiment 11 or 12, wherein the acid catalyst does not include a supported hydrogenation metal.

Embodiment 14. The method of any of Embodiments 11 to 13, wherein the acid catalyst further comprises 0.1 wt % to 5.0 wt % of a hydrogenation metal supported on the acid catalyst, relative to the weight of the acid catalyst; or wherein the hydrocarbon synthesis catalyst further comprises 0.05 wt % to 2.0 wt % of a promoter metal; or a combination thereof.

Embodiment 15. A synthesis product comprising hydrocarbons formed according to the method of any of Embodiments 11 to 14.

Additional Embodiment A. The method of Embodiment 14, i) wherein the hydrogenation metal comprises Pt, Pd, or a combination thereof; ii) wherein the promoter metal comprises Ru, Re, Zr, or a combination thereof; or iii) a combination of i) and ii).

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A catalyst system, comprising:
a hydrocarbon synthesis catalyst comprising 5.0 wt % or more cobalt on an oxide support, relative to the weight of the oxide support; and
an acid catalyst having an Alpha value of 2.0 to 100 comprising an amorphous oxide, a zeotype framework with a pore channel size of 6.5 Angstroms or more, or a combination thereof,
the hydrocarbon synthesis catalyst and the acid catalyst comprising a catalyst mixture having a weight ratio of the hydrocarbon synthesis catalyst to the acid catalyst between 0.1 and 9.0,
wherein the acid catalyst further comprises 0.1 wt % to 5.0 wt % of a hydrogenation metal supported on the acid catalyst, relative to the weight of the acid catalyst or wherein the hydrocarbon synthesis catalyst further comprises 0.05 wt % to 2.0 wt % of a promoter metal relative to the weight of the hydrocarbon synthesis catalyst or a combination thereof.

2. The catalyst system of claim 1, wherein the acid catalyst comprises an Alpha value of 2.0 to 80.

3. The catalyst system of claim 1, wherein the acid catalyst does not include a supported hydrogenation metal.

4. The catalyst system of claim 1, wherein the acid catalyst comprises an FAU zeotype framework.

5. The catalyst system of claim 1, wherein the amorphous oxide comprises silica and alumina, or wherein the oxide support of the synthesis catalyst comprises an Alpha value of less than 2.0, or a combination thereof.

6. The catalyst system of claim 1, i) wherein the hydrogenation metal comprises Pt, Pd, or a combination thereof; ii) wherein the promoter metal comprises Ru, Re, Mn, Zr, Ir, Au, Ag, Ce, Ba or a combination thereof; or iii) a combination of i) and ii).

7. A catalyst system, comprising:
a synthesis catalyst comprising 5.0 wt % or more cobalt on an oxide support, relative to the weight of the oxide support; and
an acid catalyst having an Alpha value of 80 or more comprising a MWW zeotype framework, a UFI zeotype framework, or a combination thereof, the first synthesis catalyst and the acid catalyst comprising a catalyst mixture having a weight ratio of the first catalyst to the second catalyst between 0.1 and 9.0.

8. The catalyst system of claim 7, wherein the acid catalyst comprises an Alpha value of 100 or more, or wherein the acid catalyst further comprises an amorphous oxide binder, or a combination thereof.

9. The catalyst system of claim 7, wherein the acid catalyst does not include a supported hydrogenation metal.

10. The catalyst system of claim 7, wherein the acid catalyst comprises EMM-10.

11. The catalyst system of claim 7, wherein the acid catalyst further comprises 0. 1 wt % to 5.0 wt % of a hydrogenation metal supported on the acid catalyst, relative to the weight of the acid catalyst; or wherein the hydrocarbon synthesis catalyst further comprises 0.05 wt % to 2.0 wt % of a promoter metal; or a combination thereof.

12. A method for converting a feedstock containing synthesis gas, comprising:
exposing a feedstock comprising synthesis gas to a catalyst system under conversion conditions comprising a temperature of 190° C. to 280° C. for conversion of 30 vol % or more of the CO in the feedstock to form hydrocarbons, the catalyst system comprising:
a hydrocarbon synthesis catalyst comprising 5.0 wt % or more cobalt on an oxide support, relative to the weight of the oxide support; and
an acid catalyst having an Alpha value of 100 or less comprising a amorphous oxide, a zeotype framework with a pore channel size of 6.5 Angstroms or more, or a combination thereof,
the hydrocarbon synthesis catalyst and the acid catalyst comprising a catalyst mixture having a weight ratio of the hydrocarbon synthesis catalyst to the acid catalyst between 0.1 and 9.0,
wherein the acid catalyst further comprises 0.1 wt % to 5.0 wt % of a hydrogenation metal supported on the acid catalyst, relative to the weight of the acid catalyst or wherein the hydrocarbon synthesis catalyst further comprises 0.05 wt % to 2.0 wt % of a promoter metal relative to the weight of the hydrocarbon synthesis catalyst or a combination thereof.

13. The method of claim 12, wherein the conversion conditions comprise a temperature of 210° C. to 260° C.

14. The method of claim 12, wherein the acid catalyst comprises an Alpha value of 80 or less.

15. The method of claim 12, wherein the acid catalyst does not include a supported hydrogenation metal.

16. A method for converting a feedstock containing synthesis gas, comprising:
exposing a feedstock comprising synthesis gas to a catalyst system under conversion conditions comprising a temperature of 190° C. to 280° C. for conversion of 30 vol % or more of the CO in the feedstock to form hydrocarbons, the catalyst system comprising:
a hydrocarbon synthesis catalyst comprising 5.0 wt % or more cobalt on an oxide support, relative to the weight of the oxide support; and
an acid catalyst having an Alpha value of 80 or more comprising a MWW zeotype framework, a UFI zeotype framework, or a combination thereof,
the synthesis catalyst and the acid catalyst comprising a catalyst mixture having a weight ratio of the first catalyst to the second catalyst between 0.1 and 9.0.

17. The method of claim 16, wherein the conversion conditions comprise a temperature of 210° C. to 260° C.

18. The method of claim 16, wherein the acid catalyst comprises an Alpha value of 100 or more, or wherein the acid catalyst further comprises an amorphous oxide binder, or wherein the acid catalyst does not include a supported hydrogenation metal.

19. The method of claim 16, wherein the acid catalyst further comprises 0.1 wt % to 5.0 wt % of a hydrogenation metal supported on the acid catalyst, relative to the weight of the acid catalyst; or wherein the hydrocarbon synthesis catalyst further comprises 0.05 wt % to 2.0 wt % of a promoter metal; or a combination thereof.

* * * * *